UNITED STATES PATENT OFFICE.

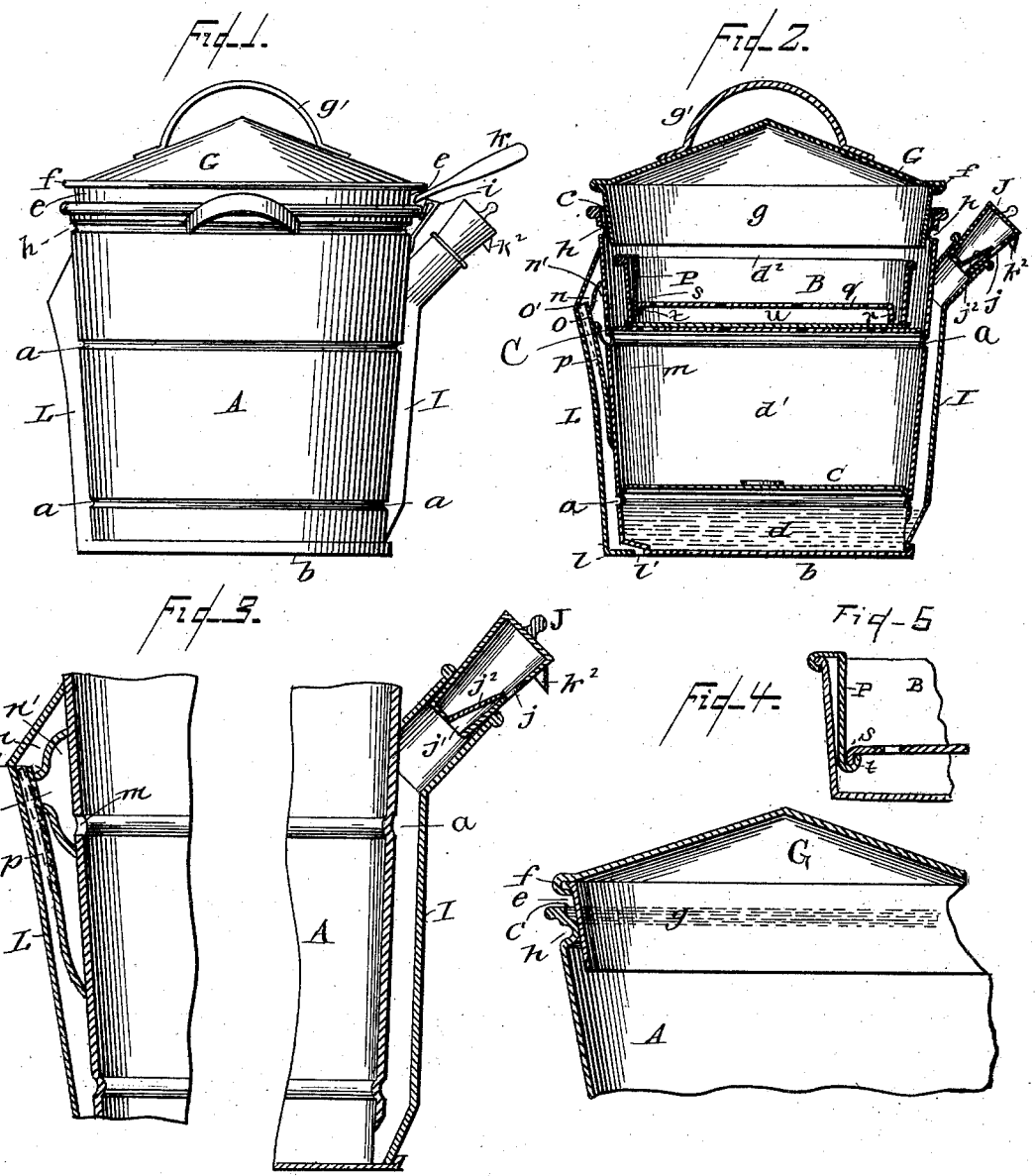

ALEXANDER M. AMOS, OF BUFFALO, NEW YORK.

STEAM-COOKER.

SPECIFICATION forming part of Letters Patent No. 370,594, dated September 27, 1887.

Application filed November 4, 1886. Serial No. 217,973. (No model.)

*To all whom it may concern:*

Be it known that I, ALEXANDER M. AMOS, a citizen of the United States, residing at Buffalo, in the county of Erie and State of New York, have invented certain new and useful Improvements in Steam-Cookers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to steam culinary cookers in which the vegetables, &c., are cooked in separate compartments, and is an improvement on Letters Patent of the United States, granted to me September 20, 1879, No. 220,048, and March 21, 1882, No. 255,232.

The invention as constructed and applied will be understood by the following specification and claims.

In the drawings, Figure 1 is a side elevation of the steam-cooker; Fig. 2, a vertical cross-section of same; Fig. 3, a fragmentary vertical section of part of Fig. 2, slightly enlarged; Fig. 4, a fragmentary sectional view of part of cover and upper part of body; Fig. 5, a fragmentary view of the pan and plate therein.

A represents the main body of the cooker, which tapers slightly from top to bottom, and has inwardly-projecting ribs $a\,a$, on which rest the perforated partition-plates C C, dividing the body A into compartments, the lower one, $d$, formed between the bottom $b$ and plate C, making the water-chamber in which steam is generated.

G represents the cover, having an extra-deep rim, $g$, and which tapers inwardly, as shown, and for a special purpose. Near the upper edge the body A is constructed with an inwardly-projecting bead, $h$, leaving a space above the bead, thereby forming a gutter, $c$, between it and the top edge, which flares outward a little, as shown, and, when the rim $g$ of the cover G is set in place, makes a complete water-receptacle for any steam that may work up and which immediately condenses. This construction and arrangement of the cover G $g$ and gutter $c$ is important, so as to make a steam-joint. The cover is not intended to fit down tightly on the cooker, as is usual, but is made with the deep rim $g$ and tapering a little, so that when pressed in it will bind near the center of the rim against bead $h$, as shown in Figs. 2 and 4, and, being flexible at that part, it will better adapt itself to a true circle. Above the middle of the rim there is little or no elasticity. The more the cover is pressed down of course the tighter it will bind, adapting itself to the bead $h$, and still will leave a space, $e$, all around between the projecting edge $f$ of the cover G and edge of the cooker, it having also another object, to be presently explained. By this simple arrangement any steam that arises is condensed at once and falls into the gutter $c$, and, there remaining, makes a water-seal and steam-tight joint, and into which a little water can be put as soon as steam inside generates, making an additional preventive. Thus it will be seen that by my cover G, with its projecting edge $f$, deep rim $g$, bead $h$, and gutter $c$ combined, it is absolutely impossible for steam to escape, this being of the greatest value in a steam-cooker, especially that it should not escape at the cover or lid.

It is obvious that when the device becomes heated the cover will bind more and more, as is intended by my deep rim $g$. To now remove the cover by hand is well nigh impossible. I therefore construct on the side of the body A one or more projecting lugs, $i$, (see Fig. 1,) to act as a fulcrum. The top of said lug projects up above the rim of the cooker and nearly meets the rim $f$ of the cover, so as to make a proper fulcrum, and use a lever-handle, $k$, or its equivalent to pry the cover off. This arrangement is absolutely necessary in a steam-cooker of this construction.

I represents a tube formed on the outside of the body A, its lower end opening into the steam-chamber $d$, and through this water is supplied to the cooker. It is also utilized as a monitor or whistle as follows:

J is a hollow plug or stopper closing the outer open end of the tube I. The plug is provided on the side with an opening, $j$, and an opening, $j'$, in its bottom, registering together by a partition, $j^2$, extending from the bottom of the plug to the lower edge of the opening $j$. This makes a whistle or monitor to indicate by the escaping steam that the water is low, or below the opening from chamber $d$ into the tube I.

$k^2$, Figs. 2 and 3, is a lip or guard formed on the side of the plug J, above the opening $j$, whereby the steam escaping through the opening $j$ is deflected and prevented from coming in contact with the hand when the plug is being removed from the tube.

L represents a steam passage or tube formed on the outside of the body A, and extending preferably from near the top to the bottom, and bent under a short distance at $l$, only enough to carry what steam may pass through this tube immediately under the bottom $b$ and into the fire, as shown at $l'$, Fig. 2.

$m$ is an opening formed in the body of the cooker opposite the upper end of the tube L. $n$ is a guard or shield secured to the outside of body A, surrounding the opening $m$, and forming a chamber, $n'$, between the upper end of tube L and opening $m$. This shield is provided with an opening, $o$, which is arranged a short distance above the opening $m$. The opening $o$ forms a communication between the opening $m$ in the cooker and tube L, and has an outwardly-projecting annular rim or flange, $o'$.

$p$ represents a valve made of a flat piece of spring metal, secured at the lower end in the tube L, and its free end closing automatically the opening $o$. The tension of this valve being very light allows the surplus steam in the cooker to escape through openings $m$ and $o$ when it has become excessive in force, and exits into tube L and down through the bent part $l\,l'$ under the bottom directly into the fire. This bent part $l$ of the tube is made in line with the bottom of the cooker by merely pressing up the bottom into a permanent curve for about an inch in length only, the cooker-bottom, in fact, for that short space making the upper part of this portion of the tube. This construction allows the bottom of the cooker to set evenly on the stove and receive the heat directly by conduction through its whole surface. It also does away with the disadvantages of having the tube inside the chamber $d$, as is sometimes the case. By forming the guard $n'$ around the opening $m$ any grease or other substances that would gather or otherwise lodge around the opening and the face of the valve, and thereby obstruct its working, will accumulate in the chamber $n'$ without obstructing the opening $o$ or the working of the valve. The rim $o'$, surrounding the opening $o$, retains the face of the valve away from the side of the guard $n'$, thus preventing any sediment or substance which might work through the opening $o$ or any rust from coming in contact with the valve and thereby preventing its opening or closing.

There is a direct action between the valve $p$ and tube L and the whistle, as without the valve $p$ to close the opening $o$ the whistle J in tube I would not sound, no matter how low the water got.

B in Figs. 2 and 5 is an open pan or dish for holding fluids, &c., having a permanent solid bottom and a perforated false bottom, $q$, formed to set therein as follows: One end of this false bottom is bent down to rest on the bottom of the pan, forming a leg, $r$. The opposite end, $s$, is cut off or bent a little to rest on a ledge, $t$, of a flat plate, P, suspended by hooks formed on this plate and hung on the edge of the pan, as shown. The space between the back of this plate and the curve of the pan, and also under the plate and bottom $q$, forms a steam-passage, $u$, which allows steam to reach underneath as well as above.

By this simple construction a pan that will hold liquids can be used in a steam-cooker, so that steam will cook meats or vegetables crowded closely therein, and which would not cook evenly otherwise, but only on top.

I claim—

1. In a steam-cooker, the combination of the cover G, having the inwardly-projecting rim $g$, the tapering body A, having the projecting rib $h$, forming the gutter $c$, the fulcrum or lug $i$, attached to the side of the body A, and the handle K, all substantially as and for the purpose specified.

2. In a steam cooker, the combination, with the body A, of a tube, I, formed on the outside of the body A, with its lower end communicating with the body, and a hollow plug, J, seated in the outer open end of the tube I and provided with a lateral opening, $j$, a bottom opening, $j'$, a wall, $j^2$, extending upwardly from the bottom opening and terminating near the lateral opening, and a lip or guard, $k^2$, formed above the lateral opening $j$, whereby the steam escaping from the opening $j$ is deflected outwardly, all substantially as set forth.

3. In a steam-cooker, the combination, with the body A, provided with an opening, $m$, in its side, of a guard or shield, $n$, covering the opening $m$ and provided with an opening, $o$, having a raised annular rim, $o'$, a spring-valve, $p$, bearing upon the raised rim $o'$, and a pipe, L, inclosing the guard $n$, substantially as set forth.

4. In a steam-cooker, the combination, with the body A, provided with an opening, $m$, in its side, of a guard or shield, $n$, covering the opening $m$, an opening, $o$, spring-valve $p$, and tube L, bent at lower end in a line with the bottom, all arranged and operating substantially as and for the purpose specified.

5. In a steam-cooker, in combination with the steam-tight cover G $g$ $f$, body A, having the rib $h$, the fulcrum or lug $i$, attached to the side of the body A, and the handle K, all substantially as and for the purpose specified.

In testimony whereof I affix my signature in presence of two witnesses.

ALEXANDER M. AMOS.

Witnesses:
J. R. DRAKE,
T. H. PARSONS.